United States Patent
Varner et al.

Patent Number: 5,603,909
Date of Patent: Feb. 18, 1997

[54] SELECTIVE CATALYTIC REDUCTION REACTOR INTEGRATED WITH CONDENSING HEAT EXCHANGER FOR MULTIPLE POLLUTANT CAPTURE/REMOVAL

[75] Inventors: Michael G. Varner, Canton; Dennis W. Johnson, Barberton; Robert B. Myers, Norton, all of Ohio

[73] Assignee: The Babcock & Wilcox Company, New Orleans, La.

[21] Appl. No.: 510,807

[22] Filed: Aug. 3, 1995

[51] Int. Cl.[6] ..................... B01J 8/02
[52] U.S. Cl. ............... 423/239.1; 422/173
[58] Field of Search ............ 422/173; 110/345, 110/346; 423/239.1

[56] References Cited

U.S. PATENT DOCUMENTS

| | | | |
|---|---|---|---|
| 3,638,708 | 2/1972 | Farin | 159/47 WL |
| 4,263,021 | 4/1981 | Downs et al. | 55/73 |
| 4,431,617 | 2/1984 | Farin | 423/232 |
| 4,487,139 | 12/1984 | Warner | 110/345 |
| 4,526,112 | 7/1985 | Warner | 110/345 |
| 4,557,202 | 12/1985 | Warner | 110/216 |
| 4,557,380 | 3/1986 | Warner | 29/157.3 |
| 4,669,530 | 6/1987 | Warner | 165/1 |
| 4,705,101 | 11/1987 | Warner | 165/111 |
| 4,726,302 | 2/1988 | Hein et al. | 110/345 |
| 4,776,391 | 10/1988 | Warner | 165/111 |
| 4,852,344 | 8/1989 | Warner | 60/39.182 |
| 5,018,457 | 5/1991 | Brady et al. | 110/346 |
| 5,139,757 | 8/1992 | Topsoe | 423/239 |
| 5,178,101 | 1/1993 | Bell | 122/4 D |
| 5,246,471 | 9/1993 | Bhat et al. | 55/223 |
| 5,368,096 | 11/1994 | Williams | 165/113 |

OTHER PUBLICATIONS

"Utility Seeks to Integrate Heat Recovery Flue Gas Treatment," *Power*, May, 1993.
B&W White Paper, 1993.
DOE Proposal, "Multiple Pollutant Removal Using the Condensing Heat Exchanger", Sep. 23, 1994.
P. A. Bhat et al., "Results of Particulate and Gaseous Sampling from a Wet Scrubber Pilot Plant", Wash. D.C. Apr. 5–8, 1993.

*Primary Examiner*—Michael Lewis
*Assistant Examiner*—Amy M. Harding
*Attorney, Agent, or Firm*—Daniel S. Kalka; Robert J. Edwards

[57] ABSTRACT

A system is disclosed for minimizing equipment and flue fouling for any boiler, turbine, or combustion process in which heat recovery is advantageous and pollutant removal is necessary. The process uses an SCR located upstream of a condensing heat exchanger and maintains the temperatures in the flue gas duct such that ammonia slip and ammonium salt products are collected only on the heat exchanger surfaces which are periodically washed with water and this wash water being collected.

6 Claims, 6 Drawing Sheets

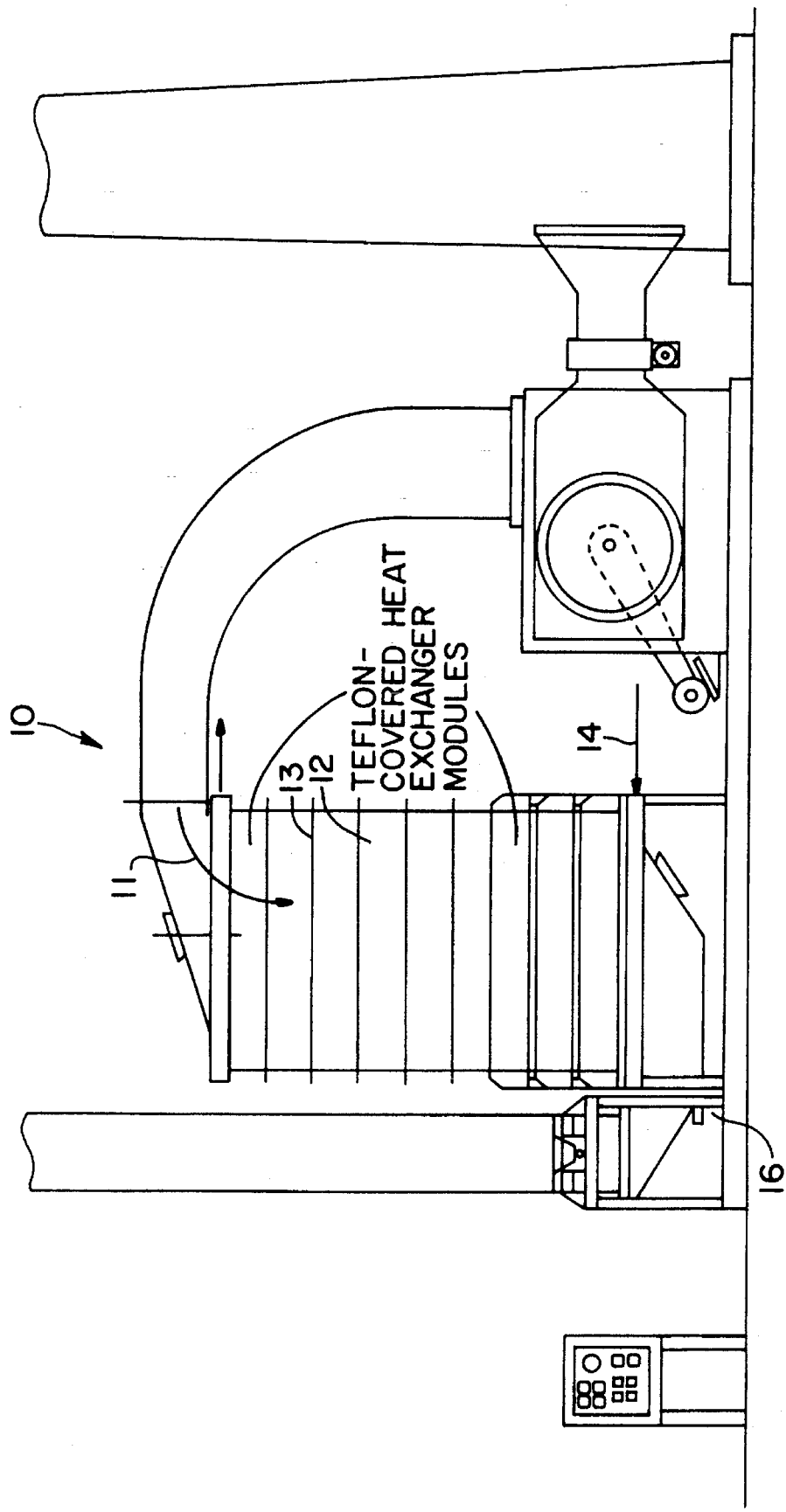

SELECTIVE CATALYTIC REDUCTION REACTOR INTEGRATED WITH CONDENSING HEAT EXCHANGER FOR MULTIPLE POLLUTANT CAPTURE/REMOVAL

BACKGROUND OF THE INVENTION

1. Field of the Invention

The present invention relates in general to the decontamination of flue gas and particularly to a new and useful method to recover fly ash, sulfur oxides and/or other contaminants contained in flue gases, as well as recovering ammonium salt reaction products and ammonia slip which results as a waste product of selective catalytic reaction of the oxides of nitrogen.

2. Description of the Related Art

There are several systems relating to integrated heat recovery and the removal of particulates, sulfur oxides/acid gases and contaminants from a hot combustion exhaust gas in order to comply with federal and state requirements.

One system, which is shown in FIG. 1, is a condensing heat exchanger, generally designated 10, which recovers both sensible and latent heat from flue gas 11 in a single unit. The arrangement allows for the gas 11 to pass down through heat exchanger 12 while water 14 passes upward in a serpentine path through Teflon, a registered trademark of Du Pont Corp., covered tubes 13. Condensation occurs within the heat exchanger 12 as the gas temperature at the tube surface is brought below the dew point. The condensate falls as a constant rain over the tube array and is removed at the bottom at outlet 16. Gas cleaning can occur within the heat exchanger 12 by the mechanisms of absorption, condensation and impaction as the gas 11 is cooled below the dew point.

The heat exchanger tubes 13 FIGS. 2b and 2c and inside surfaces of heat exchanger shell 15 are made of or covered with a corrosion resistant material. One such corrosion resistant covering is fluoroplastic such as fluorinated ethylene propylene (FEP, tetrafluoroethylene (TFE) or polytetrafluoroethylene (PTFE) like Teflon 17, a registered trademark of Du Pont Corp. The selection of material protects the heat exchanger from corrosion when the flue gas temperature is brought below the acid dew point. Interconnections between the heat exchanger tubes 13 are made outside the tube sheet 15 through holes 19 which are sealed by Teflon seal 18 and are not exposed to the corrosive flue gas stream 11. The modular design of this heat exchanger is shown in FIG. 2a.

It should be noted that while the heat exchanger is called a condensing heat exchanger, condensation does not occur under all conditions or on all surfaces. Condensation will occur when the tube surfaces are brought below the dew-point of the condensible gas. The condensing heat exchanger is specifically constructed of corrosion zesistant materials for survival under condensing conditions and during washing.

Another system used in this area is an integrated flue gas treatment (IFGT) condensing heat exchanger, generally designated 20, which is schematically shown in FIG. 3. Condensing heat exchanger unit 20 is designed to enhance the removal of pollutants, particulate, sulfur oxides/acid gases and other contaminants from flue gas stream 22. It is also made of corrosion resistant material or has all of the inside surfaces covered by Teflon, or like material.

There are four major sections of the IFGT 20: a first heat exchanger stage 24, an interstage transition region 26, a second heat exchanger stage 28, and a mist eliminator 30. The major differences between the integrated flue gas treatment design of FIG. 3 and the conventional condensing heat exchanger design of FIG. 1 are:

1. the integrated flue gas treatment design uses two heat exchanger stages 24 and 28 instead of one heat exchanger 12. (FIG. 1);

2. the interstage or transition region 26, located between heat exchanger stages 24 and 28, is used to direct the gas 22 to the second heat exchanger stage 28, and acts as a collection tank and allows for treatment of the gas 22 between the stages 24 and 28;

3. the gas flow in the second heat exchanger stage 28 is upward, rather than downward;

4. gas outlet 29 of the second heat exchanger stage is equipped with an alkali reagent spray system, generally designated 40, comprising reagent source 42 with a pump 44 for pumping reagent 42 to sprayers 46; and 5. the mist eliminator 30 is used to separate the water formed by condensation and sprays from the flue gas.

Most of the sensible heat is removed from the gas 22 in the first heat exchanger stage 24 of the IFGT 20. The transition region 26 can be equipped with a water or alkali spray system 48. The system 20 saturates the flue gas 22 with moisture before it enters the second heat exchanger stage 28 and also assists in removing particulate, sulfur pollutants, acid gases and other contaminants from the gas 22.

The transition piece 26 is made of corrosion resistant material like fiberglass-reinforced plastic. Additionally, the second heat exchanger stage 28 is operated in the condensing mode, removing latent heat from the gas 22 along with pollutants. Also, the top of this second heat exchanger stage 28 is equipped with an alkali solution spray device 46. The gas 22 in this stage 28 is flowing upward while the droplets in the gas 22 fall downward. This counter-current gas/droplet flow provides a scrubbing mechanism that enhances particulate and pollutant capture. The captured particulate, sulfur oxides/acid gases and contaminants that are contained in the falling condensate/reacted alkali droplets flow downward and are collected at the bottom of the transition section 26. The flue gas outlet 29 of the IFGT 20 is equipped with the mist eliminator 30 to reduce the chance of moisture carryover.

Other treatment methods include wet chemical absorption processes, i.e. the use of wet scrubbers such as the unit 50 shown in FIG. 4, and in particular those applications where the hot gas 22 is typically washed in an upflow gas-liquid contact device 52 (i.e. spray tower) with an aqueous alkaline solution or slurry by sprayers 54 in order to remove sulfur oxides and/or other contaminants from the gas 22.

Wet chemical absorption systems installed by electric power generating plants typically utilize calcium, magnesium or sodium based process chemistries, with or without the use of additives, for flue gas desulfurization.

Additionally, wet scrubbing systems are used as described in U.S. Pat. No. 4,263,021 which utilizes a gas-liquid contact system for obtaining counter-current gas-liquid contact between a flue gas containing sulfur dioxide and a aqueous slurry solution. This system is currently referred to as a tray or gas distribution device.

Other wet scrubber devices utilize various types of packing inside the spray tower to improve gas-liquid distribution which works well with clear solution chemistry processes, but are prone to gas channeling and pluggage in slurry services.

Most of the wet scrubbers use mist eliminators, normally 2–3 stages, in order to remove entrained water droplets from the scrubber gas.

Selective catalytic reduction (SCR) systems are also known which catalytically reduce $NO_x$ from flue gas formed during the combustion of waste materials, coal, oil and other fossil fuels, which are burned by power generating plants and other industrial processes to nitrogen ($N_2$) and water ($H_2O$) using ammonia ($NH_3$) in a chemical reduction process. SCR systems provide the most effective method of reducing $NO_x$ emissions especially where high reduction percentages (70–90%) or low stack emission levels are required. $NO_x$ emissions from boilers are typically 90 to 95% nitrogen oxide (NO) with the balance being nitrogen dioxide ($NO_2$). However, when the flue gas is discharged from the stack, the bulk of the NO is oxidized to $NO_2$ which reacts in the environment producing smog constituents and acid rain.

For combustion processes utilizing SCR systems, the catalyst is housed in a reactor which is strategically located within the flue gas system. This location permits catalyst exposure to proper SCR reaction temperatures. The reactor design includes a sealing system to prevent flue gas bypassing and an internal support for structural stability of the catalyst. The reactor configuration can be vertical or horizontal depending on the fuel used, space available and upstream/downstream equipment arrangement.

Ammonia ($NH_3$) is introduced upstream of the SCR reactor either in the form of anhydrous ammonia or vaporized aqueous ammonia. Uniform flow distribution of ammonia is required for optimum performance, therefore, the ammonia vapor is diluted with air or recirculated flue gas to provide the mass necessary to distribute the ammonia evenly over the fluework cross-section. The diluted ammonia mixture is delivered to a grid of injection pipes located in the fluework. Although the ammonia is distributed uniformly across the flue cross-section, some ammonia passes through the catalyst bed unreacted. The unreacted ammonia is known as $NH_3$ slip. Since the $NH_3$ slip will combine with sulfur trioxide ($SO_3$) and sulfur dioxide ($SO_2$) at temperatures experienced downstream of the SCR, the downstream equipment tends to get fouled by the deposition of ammonium salts. The fouling results in increased maintenance and repair costs for the equipment and decreased reliability and overall performance for the plant.

It is well documented that combustion processes typically produce sulfur dioxide ($SO_2$) and sulfur trioxide (SOB). Sulfur trioxide is typically produced in much smaller quantities. However, one known problem with using SCR technology on processes which burn sulfur-laden fuels is the oxidation of $SO_2$ to $SO_3$. The SCR catalyst oxidizes sulfur dioxide to sulfur trioxide as the flue gas passes through the catalyst bed. The $SO_3$ then combines with the $NH_3$ slip to form ammonium salts which tend to foul downstream equipment.

SCR catalyst manufacturers have combated the problem to some extent by formulating catalysts which are less reactive. Hence, the $SO_2$ oxidation rate is much less. The disadvantage to using lower activity catalyst is that more catalyst is required to achieve the same $NO_x$ reduction. Moreover, the per-unit catalyst price is sometimes higher because of the special formulation.

In view of the foregoing, it is seen that an efficient system for removing flue gas $NO_x$ while minimizing the threat of ammonium salt deposition on downstream equipment is needed which would be both cost and operationally effective. Furthermore, it is seen that an efficient system was needed to enable a condensing heat exchanger system to capture ammonium salts without compromising heat transfer efficiency.

SUMMARY OF THE INVENTION

The present invention is directed to solving the problems associated with prior art systems and especially the problem of equipment fouling when using selective catalytic reduction (SCR) systems in applications which fire sulfur-laden fuels. Moreover, the invention provides condensing heat exchange (CHX) systems the ability to remove flue gas $NO_x$ without compromising heat exchange or pollutant removal efficiency. The invention locates an SCR system upstream of a condensing heat exchanger to remove flue gas $NO_x$. By placing the SCR upstream in the hot temperature region, the invention allows for high $NO_x$ removal efficiency. Since the condensing heat exchanger is downstream in the lower temperature region, the invention enables significant removal of condensible flue gas pollutants as well as waste products such as ammonia slip and ammonium salt products from the SCR system.

The flue gas passes through the catalyst, reducing $NO_x$ to the required level. As the flue gas temperature starts to fall, ammonia slip within the flue gas combines with moisture and sulfur trioxide. The three (3) constituents react according to the overall equation: $NH_3(g) + SO_3(g) + H_2O(g) \rightarrow (NH_4)HSO_4$. The ammonium salts begin to form in the liquid state at temperatures as high as 450° F. The liquid salt catches flyash and other particulate within the flue gas. Then, the sticky substance which results adheres to downstream equipment surfaces. The surfaces require water washing or sootblowing periodically to prevent excessive buildup of the deposits.

In addition, aerosol mists/fumes and/or fine particulates are formed as the ammonia slip reacts with the $SO_x$, HCl and other acidic constituents in the flue gas. Most of the compounds formed are water soluble. The ammonia salt deposits usually adhere to air heater surfaces thereby reducing heat transfer and increasing gas side pressure loss. Moreover the ammonia salt deposits can inhibit effective particulate collections since the sticky deposit adhere to the collection plates of known electrostatic precipitators.

In another embodiment, the CHX is located upstream of the SCR system. By placing the CHX upstream of the SCR the CHX (possibly of ceramic or alloy construction) collects unburned hydrocarbon (UBHC) as well as oil mist carryover which tend to collect on SCR catalyst surfaces. Besides blinding the SCR catalyst pores and degrading $NO_x$ removal catch fire if the flue gas temperature is raised too rapidly. These problems are avoided with this configuration.

In view of the foregoing it will be seen that one aspect of the present invention is to provide a flue gas sulfur and pollutant removal system which will not foul system equipment.

Another aspect is to provide a system which will remove waste products such as ammonia slip and ammonium salt products.

Still another aspect is to provide a combined heat recovery and pollutant removal system which will remove flue gas $NO_x$ without hurting heat recovery efficiency.

These and other aspects of the present invention will be more easily understood after a review of the following description of the preferred embodiment when considered with the accompanying drawings.

BRIEF DESCRIPTION OF THE DRAWINGS

In the drawings;

FIG. 1 is a schematic view illustrating a known condensing heat exchanger system;

DETAILED DESCRIPTION OF THE PREFERRED EMBODIMENT

Figure 2A:
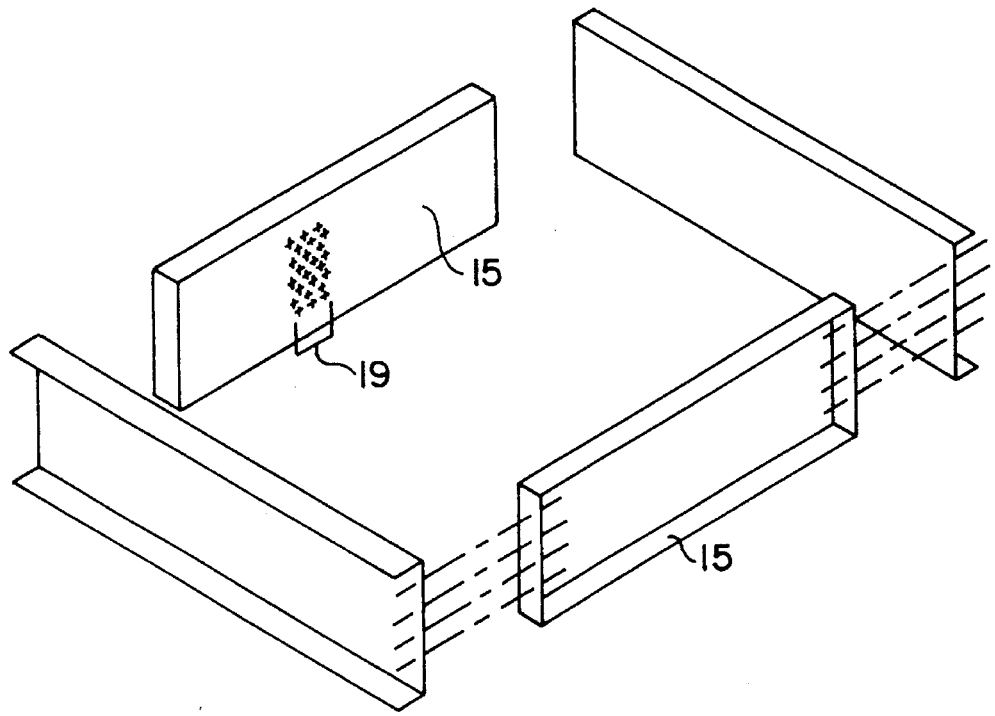
FIG. 2a, 2b, and 2c are views illustrating the arrangement and protection of heat exchanger tubes.
Figure 2B:
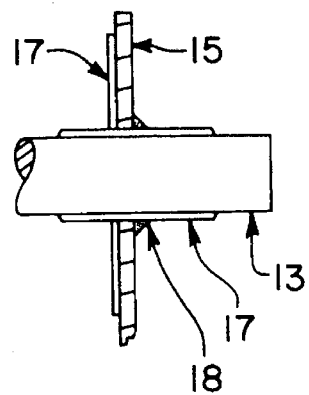
Figure 2C:
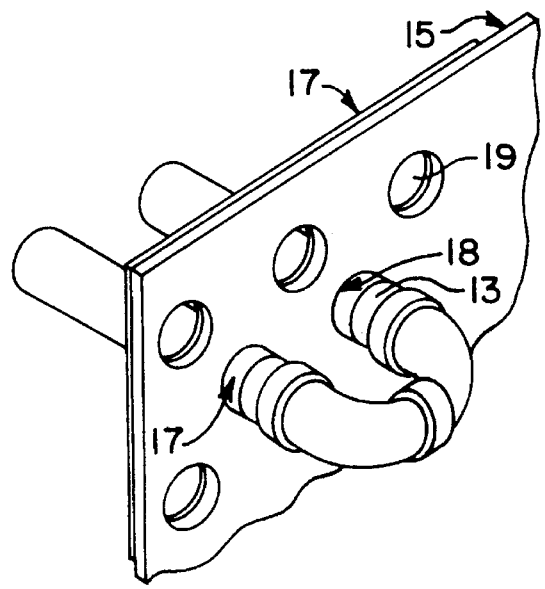
Figure 3:
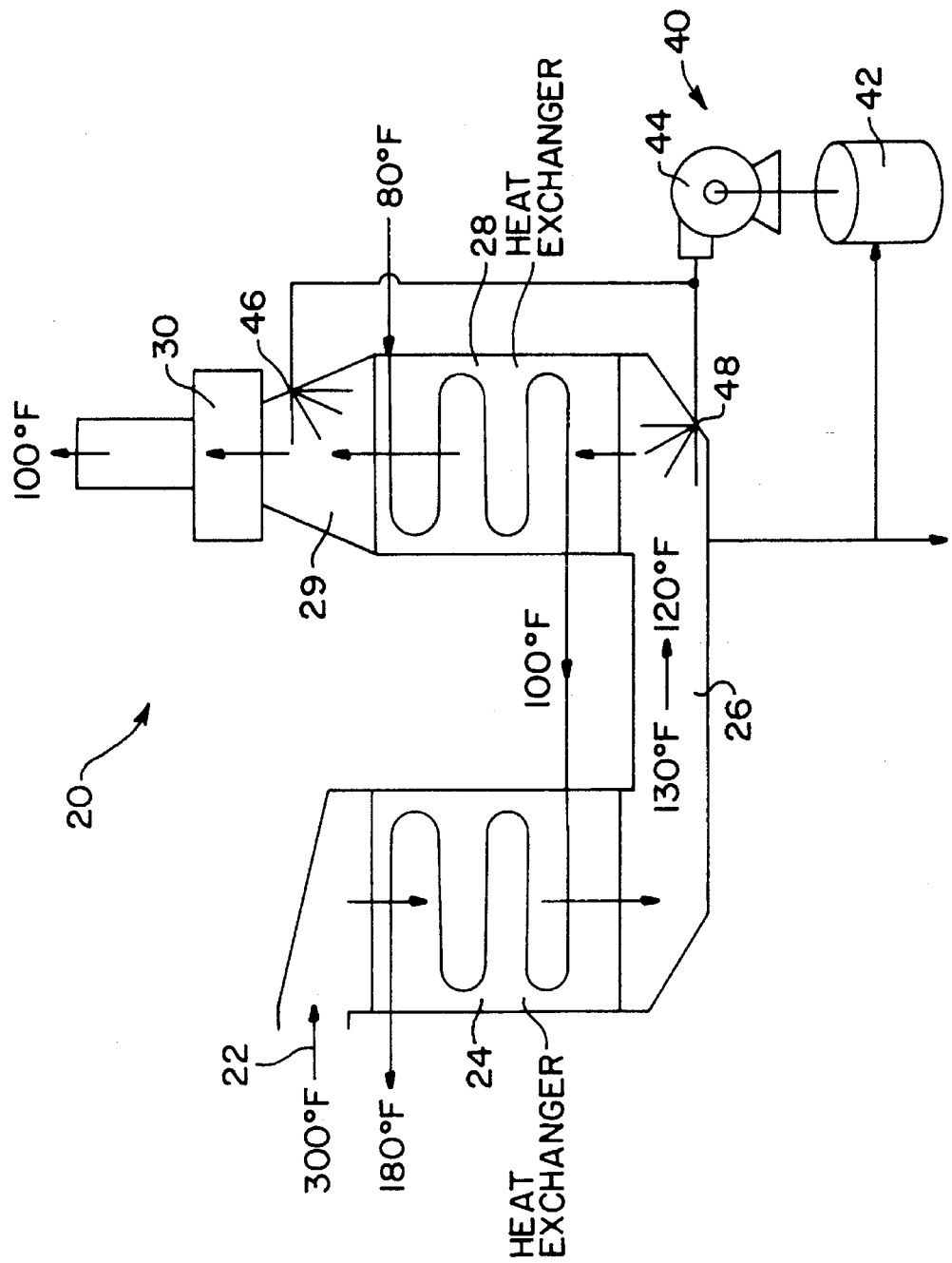
FIG. 3 is a schematic view illustrating another integrated flue gas treatment system using two heat exchangers.
Figure 4:
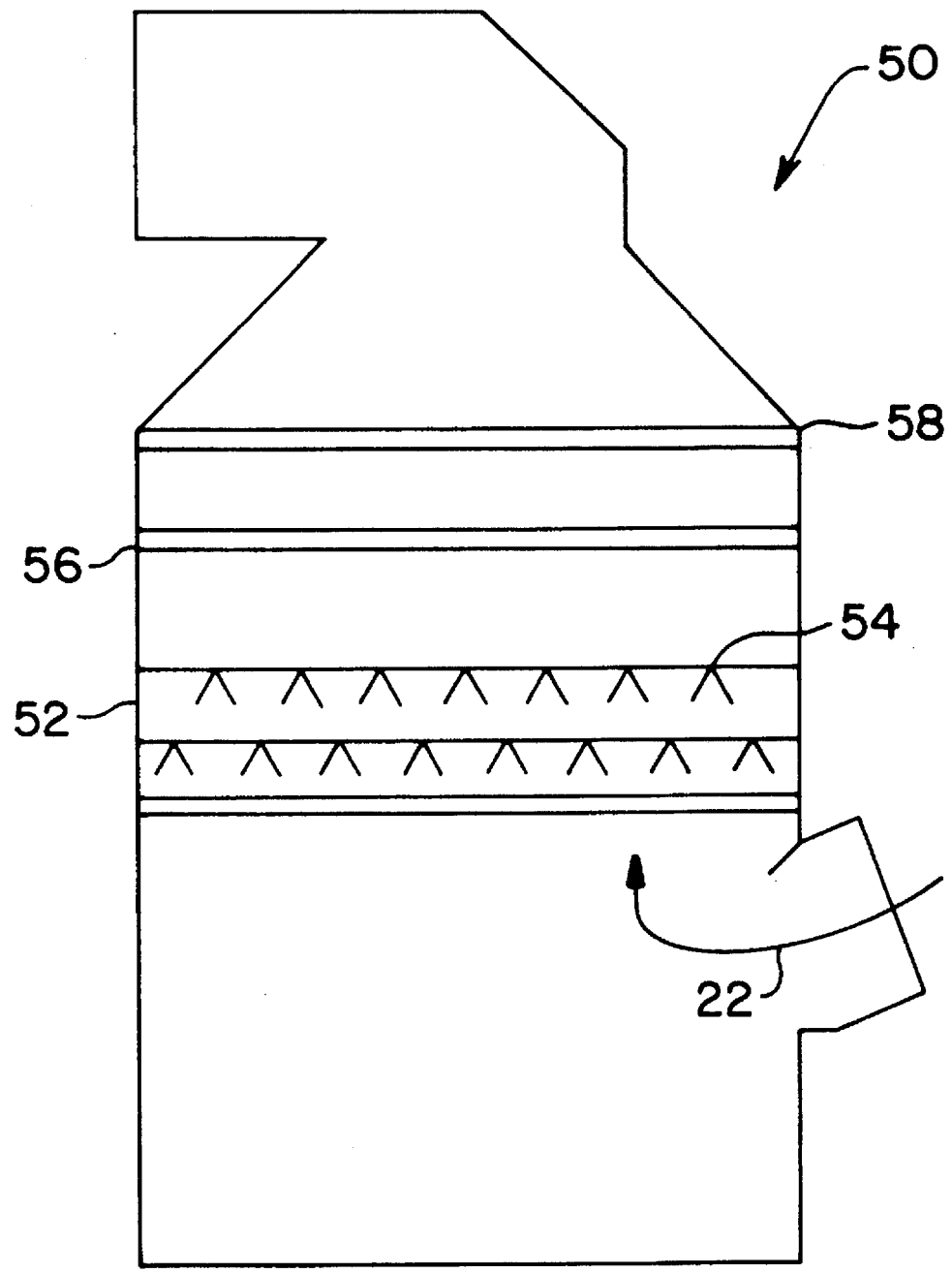
FIG. 4 is a schematic view illustrating a known wet scrubber reactor.
Figure 5:
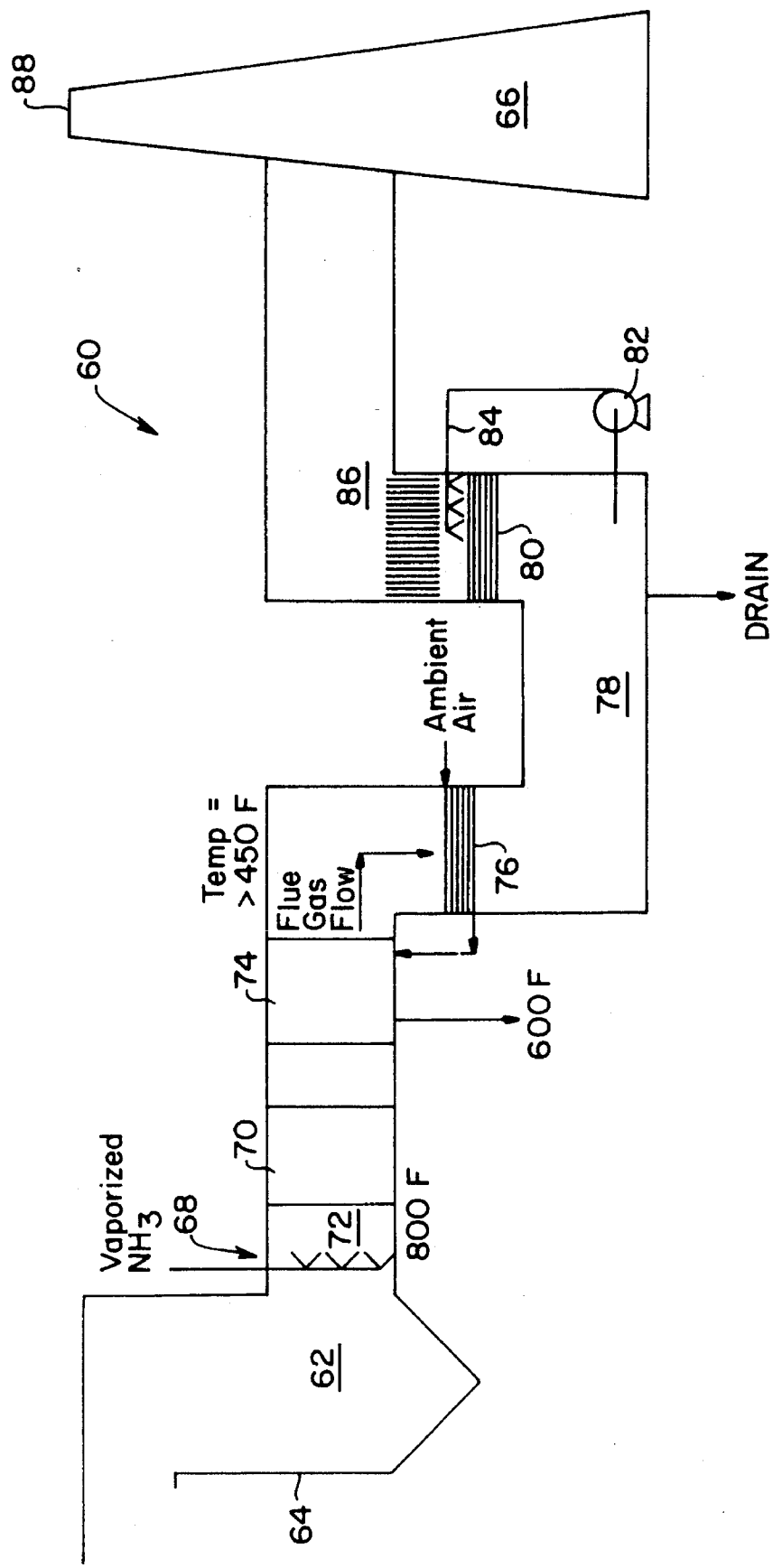
FIG. 5 is a schematic of one embodiment of the combined heat recovery and pollutant removal system of the present invention.

The present invention as shown in FIG. 5 is a combined heat recovery and pollutant removal system 60 used for removing pollutants from the exhaust 62 of a boiler 64 prior to exhausting the pollutant free flue gas from a stack 66.

The system 60 has an injection system 68 which delivers diluted ammonia vapor to the flue upstream of a SCR reactor 70. An injection grid 72 of known design evenly distributes the ammonia vapor across the flue cross-section. The flue gas, now laden with ammonia, passes through the SCR catalyst. As mentioned in the related art discussion, some of the $NH_3$ will pass through unreacted. The flue gas continues downstream to the air preheater (APH) 74. The air preheater 74 reduces the flue gas temperature to greater than 450° F. The APH is properly sized to ensure that precipitation of the ammonium salts does not occur within the air heater elements. The air preheater 74 serves to reduce the flue gas temperature from roughly 800° F. at the SCR 70 to a point close to the salt deposition temperature while simultaneously heating combustion or process air.

The flue gas is then directed downward through the first stage 76 of a condensing heat exchanger. The fluid (air) within the tubes of the first stage 76 is heated, thus removing sensible heat from the flue gas. As a result, the flue gas temperature drops below the precipitation temperature of ammonia bisulfate and ammonia sulfate. The salts begin to precipitate out and fall to the bottom of the heat exchange section into a holding tank 78. The holding tank 78 is called the interstage transition. It contains water and other condensates which have condensed out of the gas stream. A water spray is sprayed intermittently down over the first stage 76 tubes to prevent ammonium salts and other material from collecting on the tube surface.

The interstage transition acts as a collection tank. It collects and holds the water, collected ammonium salts and other constituents which condense out of the flue gas as the gas passes through the heat exchanger sections. The interstage transition has an overflow which is used to purge off condensate. By purging the tank 78 the optimum liquid level is maintained. The interstage transition is typically constructed of fiberglass reinforced plastic (FRP) or metal alloy.

The second heat exchanger section 80 causes the flue gas temperature to be lowered to temperatures of about 110–150° F. depending on the saturation temperature of the flue gas. The drop in temperature results in the condensation of moisture, ammonium salts and other constituents from the flue gas. If more $SO_3$ than $NH_3$ is present in the flue gas, then ammonia will be the reaction limiting reagent. This means that the reaction between the $NH_3$ and $SO_3$ will proceed until all the ammonia is essentially consumed. The net result is a very low (perhaps immeasurably low) concentration of $NH_3$ exiting the stack 66.

Of course, heavy metals and any other condensible compounds will condense out of the gas stream in the two-stage heat exchanger. Similar to the first stage 76, water is sprayed down over the heat exchanger tubes of the second stage 80 to prevent buildup and enhance heat transfer efficiency. A pump 82 draws effluent from the interstage transition and transfers the effluent to a spray header system 84 at the very top of the second heat exchanger section 80. The spray headers evenly distribute the water across the heat exchanger's cross-section. The cooled gas then passes through a mist eliminator section 86 before exiting out the stack 66. The mist eliminator section removes any entrained moisture droplets, thus limiting moisture carryover. Low moisture carryover reduces visible plume from the stack 66 exit 88. It will be appreciated that the elements of the system 60 comprise known prior art subsystems and the novelty of the system 60 lies in the advantages of the particular arrangement and combination of these subsystems into the system 60. Some of these advantages are:

1. Higher concentration of ammonia may be injected upstream of the SCR 70. Although the ammonia slip will increase, the IFGT will capture the excess (unreacted) ammonia. The advantage is that the required catalyst volume decreases and high $NO_x$ removal is maintained.

2. Highly reactive catalyst may be used because the $SO_2$ which is converted into $SO_3$ is captured downstream in the condensing heat exchanger. The use of catalyst with a higher reactivity results in a smaller required volume. Significant capital, maintenance and structural savings are realized.

3. The downstream equipment requires less maintenance because fouling of equipment by ammonium salts is minimized. Hence, plant availability and overall efficiency are improved.

4. The installation of sootblowers is not necessary, saving both on capital costs and periodic maintenance expenses.

5. Particulate production and/or acid gas mist carryover is minimized. Visible plumes and particulate carryover are common concerns on SCR systems which fire oil or other fuels containing sulfur. The invention proposed here will eliminate the carryover of these substances.

6. Removes air toxics, VOC's, heavy metals and other pollutants which cannot be removed by SCR alone and reduces $NO_x$ which cannot be achieved by condensing heat exchangers alone.

7. Since the production of ammonium salts is limited by the amount of $NH_3$ or $SO_3$ present, the amount of $NH_3$ injected can be controlled on a 1 to 1 stoichiometric basis. In this manner, most of the $NH_3$ and $SO_3$ will combine to form ammonium salts. The net result is very low (perhaps immeasurable) quantities of $NH_3$ and $SO_B$ emissions.

8. The invention removes unburned hydrocarbons (UBHC) and/or volatile organic compounds (VOC) and/or inorganic compounds in addition to reducing flue gas $NO_x$. So, the system can be economically justified for natural gas fired applications which typically do not produce ammonium salt reaction products.

9. The air heater size can be reduced such that the flue gas temperature is greater than 450° F., eliminating the $NH_3$—$SO_3$ reaction until the gases reach the condensing heat exchanger.

10. Recovery of latent heat in the IFGT system can improve plant thermal efficiency.

11. The system controls $NO_x$, $SO_x$, VOC and other air toxics (multi-pollutant removal) while recovering heat that can be used elsewhere in the plant.

The basic system 60 could also be arranged in certain other configurations which may be obvious to those skilled in this art area. Also, the various subsystems may be chosen from numerous offered embodiments known to those in this art area. By way of example:

1. The SCR system could be arranged in the vertical configuration instead of horizontal. The flue gas passing down through the catalyst inhibits dust accumulation and/or plugging of the SCR catalyst.

2. The IFGT system could be composed of a single stage of heat exchange tubes or of a two-stage downflow configuration.

3. The interstage transition could be sloped away from the SCR reactor down to the transition tank. Water or an alkali solution could be sprayed into the flue gas stream as it passes through the sloped interstage transition. The spray would be used to quench the gas. The lack of downstream equipment would leave less surfaces on which the ammonium salts could deposit.

4. Instead of a water spray, an alkali reagent could be sprayed over the 2nd stage of the heat exchanger tubes to further enhance the removal of $SO_2$ and other pollutants. Moreover, the reagent can be recirculated to reduce operating costs by conserving on the amount of fresh reagent required.

5. A wet or dry electrostatic precipitator (ESP) could be placed in the correct temperature zone to remove the particulate within the flue gas.

6. The air preheater could be an economizer-type unit instead of an air heater-type unit. By circulating water (instead of air) through tubes upstream of the condensing heat exchange unit, the flue gas temperature is reduced to a temperature that the CHX can withstand while pre-heating water that can be used as boiler feedwater or for other purposes. The air preheater may be of tubular or heat pipe design or of the regenerative type.

7. A wet scrubber tower could be installed downstream of the CHX in the appropriate temperature region to provide high $SO_2$/acid gas, air toxics, and/or other pollutant removal efficiencies.

8. The SCR catalyst may be any of the types commercially available. These include catalysts which are homogeneous or of monolithic design supported on inactive substrates. The catalyst substrate may be of ceramic, composite, zeolite, or metal based design.

9. The orientation of the active catalyst units can be arranged in a honeycomb, parallel plate, or any other known fashion. Moreover, the pitch of the catalyst units may be varied depending on the dust loading and other factors for the application.

10. The material of construction for the heat exchanger tubes can be of material other than Teflon covered. The tubes can be comprised of ceramics, glass, graphite, FRP or durable metal alloy material. Likewise, the flues can be constructed of materials such as durable metal alloy, FRP or coated carbon steel.

11. The method of $NO_x$ removal may be selective non-catalytic reduction (SNCR) or a combination of SNCR and SCR instead of just SCR alone, or could be a hot catalytic baghouse such as the B&W $SO_xNO_xRO_xBO_x$™ system.

12. Catalyst may be installed in the appropriate temperature zone (typically upstream of the SCR catalyst) to reduce carbon monoxide emissions.

13. Fluids other than water could be run through the tube side of the condensing heat exchanger. Water, glycol, air, liquid $CO_2$ process streams or other fluids could be run through the CHX tubes to maximize the usable heat recovery.

14. Multiple different fluids could be run through the CHX section(s) at once. In other words, the first few rows of tubes in the heat exchange section may transport and heat air while the remaining tubes in the section heat glycol or some other heat transfer fluid, which is used elsewhere in the plant.

15. The air used to dilute and vaporize the ammonia can be heated by running ambient air through the condensing heat exchanger. This results in lower operating costs because waste heat is used to heat the air and a cold air fan can be used. The use of a cold air fan also lowers capital and maintenance costs when compared to hot air fans. Furthermore, all the problems associated with vaporizing and diluting the ammonia with a slipstream of flue gas are avoided because ambient air is used.

16. The mist eliminator section may be in the horizontal or vertical orientation. The mist eliminators may be of Chevron, mesh or other design.

17. The second stage of the CHX may be installed with a perforated tray to enhance removal of sulfur dioxide and other pollutants by providing an area of intimate gas-liquid contact.

Figure 6:
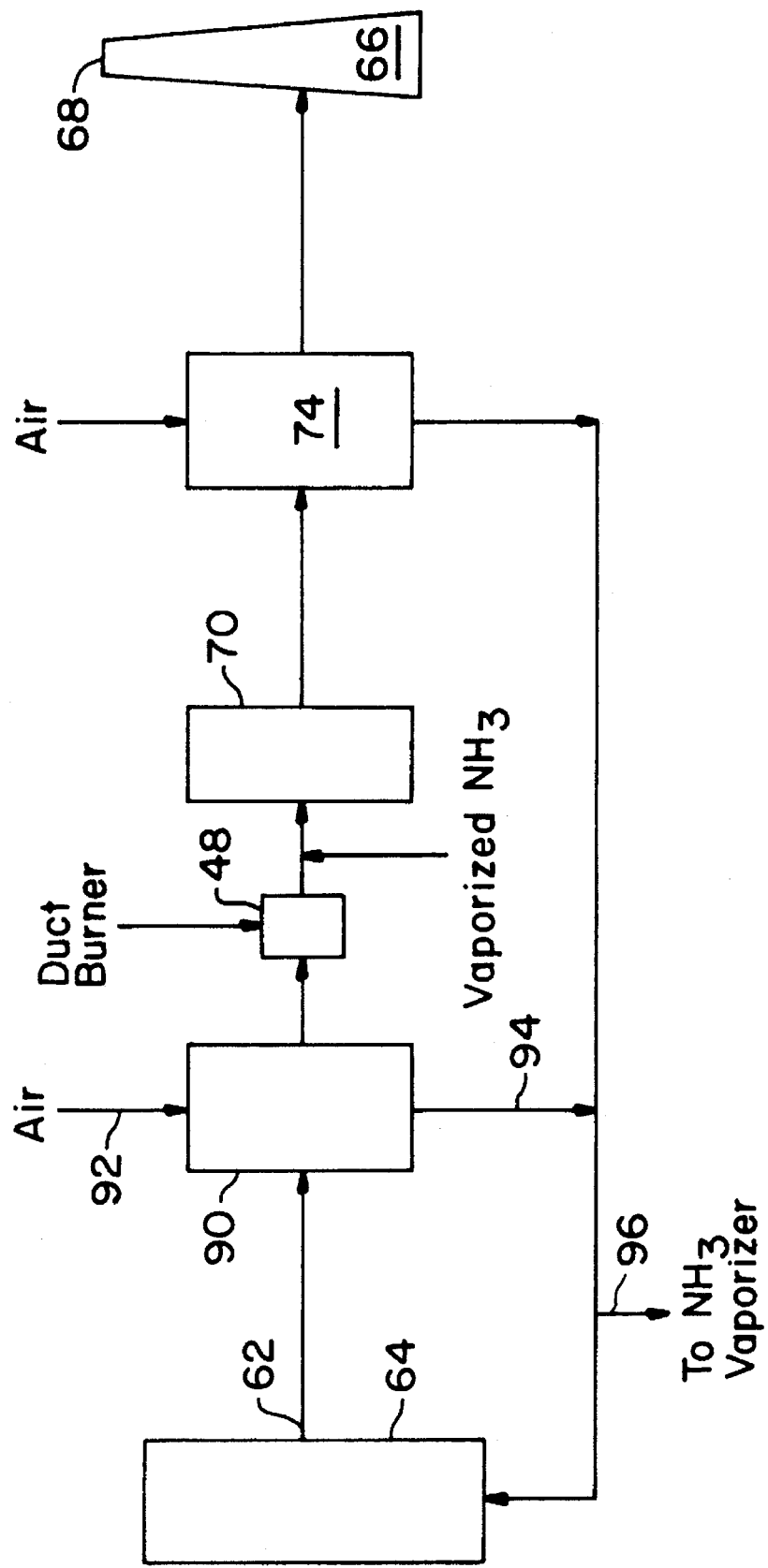
FIG. 6 is a schematic of another embodiment of the system of FIG. 5 using a condensing heat exchanger (CHX) located upstream of the SCR.

Referring now to FIG. 6, an alternative arrangement is shown in which the condensing heat exchanger (CHX) is located upstream of the SCR system. By placing the CHX upstream of the SCR, many advantages result:

The CHX (possibly of ceramic construction) collects unburned hydrocarbon (UBHC) as well as oil mist carryover which tend to collect on SCR catalyst surfaces. Besides blinding the SCR catalyst pores and degrading $NO_x$ removal efficiency, the oil mist and UBHC can cause the catalyst to catch fire if the flue gas temperature is raised too rapidly. These problems are avoided with this configuration.

Moisture from boiler tube failures, boiler tube washing and the like would not reach the catalyst and cause premature deterioration because the moisture would be removed in the CHX.

The CHX would remove flue gas contaminants, such as arsenic, phosphorus and heavy metals, that are known to cause catalyst poisoning before these constituents ever reach the catalyst. This benefit means that SCR systems could be applied to facilities that historically could not use SCR. These facilities may include waste-to-energy, wood burning, and tire burning facilities.

The removal of phosphorus and other impurities which may result from the operation of a combustion turbine means that the system can be employed for a clean fuel facility also.

Since the sulfur will be essentially removed before the flue gas reaches the catalyst, ammonia injection may occur at lower temperatures without the threat of ammonium salt reaction products. This means that the boiler will reduce $NO_x$ at lower loads because ammonia injection will be possible.

The boiler exit gas temperature may be lowered by increasing the size of the economizer. Since the furnace exit gas temperature will be lower, the furnace thermal efficiency will be increased.

The CHX will remove arsenic before it reaches the catalyst. Therefore, specially formulated arsenic-resistant catalyst would not be required for applications with high arsenic concentrations in the flue gas. Instead, more reactive, standard catalyst could be used, and the catalyst volume would be smaller.

The FIG. 6 arrangement is most compatible with lower temperature catalysts. It will be seen that like parts are numbered with the same numbers as FIG. 5 and shows the boiler 64 exhaust 62 now exhausting into a condensing heat exchanger assembly 90 which is similar to the heat exchangers 76 and 80 described in FIG. 5 and utilizes air supplied from line 92 as the heat exchange media which when heated in the CHX is exhausted along line 94 and is passed through line 96 to the $NH_3$ vaporizer for spraying vaporized $NH_3$ into the boiler duct upstream of the SCR 70.

The flue gas passing through the CHX 90 is directed through a duct burner 98 prior to passing through the SCR 70 and then through the air preheater to be exhausted from the stack 66.

Certain modifications and improvements have been deleted herein for the sake of conciseness and readability but are fully intended to be within the scope of the following claims as an example, a hot precipitator or baghouse may be used just downstream of the boiler to remove solid particulates such as flyash for recycling.

What is claimed is:

1. A combined system for recovering heat and removing pollutants from the flue gases of a boiler comprising:

a selective catalytic reduction reactor located in an exhaust flue of a boiler;

an ammonia injection station located in the exhaust flue upstream of said selective catalytic reduction reactor for supplying ammonia laden flue gas to said selective catalytic reduction reactor for $NO_x$ removal therein with slip ammonia and ammonium salts passing therefrom;

an air preheater located downstream of said selective catalytic reduction reactor for reducing a temperature of the flue gas to a temperature which prevents precipitation of the ammonium salts; and a condensing heat exchanger having a first and a second stage located in the exhaust flue downstream of said air preheater, said first stage of said condensing heat exchanger further removing heat from the flue gas passed therethrough to remove sensible heat from the flue gas and to drop the temperature thereof below a precipitation temperature of the ammonium salts, said condensing heat exchanger further having between the first and second stages an interstage transition section comprising tank means for collecting the ammonium salts, said second stage of said condensing heat exchanger further lowering the flue gas temperature for condensing remaining constituents in the flue gas and collecting slip ammonia into said interstage transition section.

2. A system as set forth in claim 1 including a water spray system for periodically washing the salt deposits from said condensing heat exchanger.

3. A system as set forth in claim 1 including a mist eliminator located in the exhaust flue downstream of said air preheater and upstream of a stack exhaust for minimizing visible plume from said stack exhaust.

4. A system as set forth in claim 1 wherein the exhaust flue is located along a horizontal run with said selective catalytic reduction reactor, air preheater, and condensing heat exchanger being located therein along said horizontal run.

5. A method for removing pollutants from a flue gas, comprising the steps of:

injecting vaporized ammonia into a flue gas in a flue duct upstream of a selective catalytic reduction reactor providing sufficient ammonia to the flue gas for slip ammonia;

removing $NO_x$ in the selective catalytic reduction reactor from the ammonia laden flue gas;

reducing the flue gas temperature with an air preheater upstream of a condensing heat exchanger to a temperature above an ammonium salt precipitation temperature; and recovering heat from the flue gas in a first stage of the condensing heat exchanger to drop the temperature below the ammonium salt precipitation temperature to initiate precipitation and collection in a holding tank of the condensing heat exchanger.

6. A method as set forth in claim 5 including the step of periodically washing the heat exchanger surfaces with water to remove any depositions therefrom.

* * * * *